US010337684B2

(12) United States Patent
Joerg et al.

(10) Patent No.: US 10,337,684 B2
(45) Date of Patent: Jul. 2, 2019

(54) LIGHTING DEVICE FOR A MOTOR VEHICLE COMPRISING A LIGHT GUIDE

(71) Applicant: VALEO VISION, Bobigny (FR)

(72) Inventors: Alexandre Joerg, Bobigny (FR); Marine Courcier, Unterfoehring (DE)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 15/720,072

(22) Filed: Sep. 29, 2017

(65) Prior Publication Data

US 2018/0087735 A1 Mar. 29, 2018

(30) Foreign Application Priority Data

Sep. 29, 2016 (FR) ...................................... 16 59376

(51) Int. Cl.
| | | |
|---|---|---|
| *B60Q 1/06* | (2006.01) | |
| *B60Q 1/16* | (2006.01) | |
| *F21V 8/00* | (2006.01) | |
| *F21S 41/24* | (2018.01) | |
| *F21S 41/26* | (2018.01) | |
| *F21S 41/27* | (2018.01) | |
| *F21S 41/141* | (2018.01) | |
| *F21S 41/153* | (2018.01) | |
| *F21S 41/265* | (2018.01) | |
| *F21S 41/663* | (2018.01) | |

(52) U.S. Cl.
CPC ................ *F21S 41/24* (2018.01); *B60Q 1/06* (2013.01); *B60Q 1/16* (2013.01); *F21S 41/141* (2018.01); *F21S 41/153* (2018.01); *F21S 41/26* (2018.01); *F21S 41/265* (2018.01); *F21S 41/27* (2018.01); *F21S 41/663* (2018.01); *G02B 6/0001* (2013.01)

(58) Field of Classification Search
CPC .. F21S 41/24; F21S 41/26; F21S 41/27; F21S 41/141; F21S 41/265; F21S 41/663; B60Q 1/06; B60Q 1/16
See application file for complete search history.

(56) References Cited

U.S. PATENT DOCUMENTS

2015/0131305 A1   5/2015   Courcier et al.

FOREIGN PATENT DOCUMENTS

| EP | 2 306 075 A2 | 4/2011 |
| EP | 2 743 567 A1 | 6/2014 |
| EP | 2 871 406 A1 | 5/2015 |

OTHER PUBLICATIONS

French Preliminary Search Report dated May 31, 2017 in French Application 16 59376, filed on Sep. 29, 2016 (with English Translation of Categories of Cited Documents).

*Primary Examiner* — Thomas M Sember
(74) *Attorney, Agent, or Firm* — Oblon, McClelland, Maier & Neustadt, L.L.P.

(57) ABSTRACT

An optical lighting module for a motor vehicle including a primary optical element having a first rear portion with a plurality of light guides of longitudinal main axis arranged along at least one transverse row, each comprising an output front end face for a secondary light beam. Also included is a front portion which has a common output front face for the secondary light beams, wherein the front face of the front portion is conformed to spread the secondary light beams at least in a vertical direction.

16 Claims, 3 Drawing Sheets

LIGHTING DEVICE FOR A MOTOR VEHICLE COMPRISING A LIGHT GUIDE

TECHNICAL FIELD OF THE INVENTION

The invention relates to an optical lighting module for a motor vehicle comprising a primary optical element comprising:
- a first rear portion comprising a plurality of light guides of longitudinal main axis arranged along at least one transverse row, and each comprising an output front end face for a secondary light beam;
- a front portion which has a common output front face for the secondary light beams.

TECHNICAL BACKGROUND OF THE INVENTION

Optical lighting modules of this type are already known. They are capable of emitting, longitudinally forward, a final light beam called "multibeam" or even "pixel beam". The final light beam projects forward an image of a matrix of elementary light sources. By selectively switching each of the elementary sources on or off, it is possible to create a final light beam specifically lighting certain zones of the road in front of the vehicle, while leaving other zones in darkness.

Such an optical lighting module is used in particular to produce an adaptive lighting function, also called "ADB", the acronym for "adaptive driving beam". Such an ADB function is intended to automatically detect a road user likely to be dazzled by a lighting beam emitted in high beam mode by a headlight, and to modify the outline of this lighting beam so as to create a dark zone where the detected user is located while continuing to light the road with a long range on either side of the user. The ADB function offers many advantages: ease of use, better visibility compared to a lighting in low beam mode, greatly reduced risk of dazzle, safer driving etc.

Such an optical module generally comprises a matrix of light sources, usually formed by light-emitting diodes (LEDs), a primary optical element comprising a plurality of light guides and a projection optic. The light-emitting diodes are arranged on a flat printed circuit board which extends in a plane orthogonal to the direction of projection of the final light beam. The light guides of the primary optical element extend overall longitudinally from a light input face to a light output face. The light guides are intended to conform the rays emitted by the light-emitting diodes into a narrower light beam, the output face of each light guide forming a pixel. The output faces of the light guides form a matrix of elementary pixels imaged by the projection optic. Each pixel can be lit selectively by activation or deactivation of each light source.

Such a primary optical element comprises a first row of first light guides intended to form elementary pixels of rectangular form which are intended to light above a cut-off line.

Such a primary optical element also comprises a second row of second light guides intended to form elementary pixels of square form which are intended to light below a cut-off line.

The images of the square pixels thus light the road in proximity to the vehicle, whereas the images of the rectangular pixels light the road to a greater distance.

The images of the rectangular pixels are likely to dazzle road users situated at a short distance from the vehicle. The adaptive lighting consists in detecting such road users and in switching off the light sources forming the pixels likely to dazzle said users while keeping the other light sources switched on to guarantee a good visibility to the driver of the vehicle.

For the optical lighting module to produce a final light beam that is comfortable for the driver, the images of the rectangular pixels vertically overlap the images of the square pixels. It has been found that the comfort of the driver was enhanced when the images of the rectangular pixels extend over more than 5° vertically.

Now, currently, a single light guide does not make it possible to obtain a rectangular pixel of such vertical extent while remaining relatively narrow transversally.

Furthermore, it has also been found that a better visual comfort was obtained when the square pixels have a dimmed bottom edge.

Moreover, a visually comfortable lighting light beam must also light the lower side of the road. Now, even by modifying the form of the light guides arranged at the transverse end of the primary optical element, the pixels produced by the transverse end light guides are not sufficiently wide to sufficiently light the side of the road.

BRIEF SUMMARY OF THE INVENTION

The aim of the invention is to present an optical lighting module that makes it possible to produce a pixel light beam, or "pixel beam", capable of comfortably lighting the road.

The invention thus relates to an optical lighting module of the type described previously, characterized in that the front face of the front portion is conformed to spread the secondary light beams at least in a vertical direction.

According to other features of the invention:
- the output face of the front portion of the primary optical element has at least one transverse vertical end strip incurved about a transverse axis to spread the secondary light beams vertically emitted by an associated row of light guides;
- the optical module comprises at least two parallel transverse rows of light guides, the output face of the front portion of the primary optical element having two transverse vertical end strips each incurved about a transverse axis to spread the secondary light beams vertically emitted by an associated row of light guides;
- the output face of the front portion comprises a central strip which extends vertically between the two vertical end strips and which has, in longitudinal vertical cross section, a vertical rectilinear form;
- at least one transverse end section of the output face of the front portion has a curvature about a vertical axis to spread the secondary light beam emitted by the corresponding end light guide of each of the rows in a transverse direction;
- the two transverse end sections of the output face of the front portion each have a curvature about a vertical axis to spread the secondary light beam emitted by the corresponding end light guides of each of the rows in a transverse direction;
- a central section of the output face of the front portion extending between the two transverse end sections has a hemicylindrical form;
- the central section extends opposite the light guides of each row except for the two end light guides;
- each light-emitting diode is associated with a light guide;
- the optical module is capable of emitting a light beam producing an adaptive lighting function.

The invention relates also to a motor vehicle lighting device comprising the module produced according to the teachings of the invention.

The lighting device further comprises a low beam module.

BRIEF DESCRIPTION OF THE FIGURES

Other features and advantages of the invention will become apparent from reading the following detailed description, for an understanding of which reference will be made to the attached drawings in which.

DETAILED DESCRIPTION OF THE FIGURES

Hereinafter in the description, the following orientations will be adopted in a non-limiting manner:
longitudinal "L", oriented from back to front along the optical axis of the projection optic of the optical module;
transverse "T", oriented from left to right;
vertical "V", oriented from bottom to top.

The vertical orientation "V" is used as geometrical reference unrelated to the direction of gravity.

Hereinafter in the description, elements having an identical structure and/or similar functions will be denoted by the same references.

Figure 1:
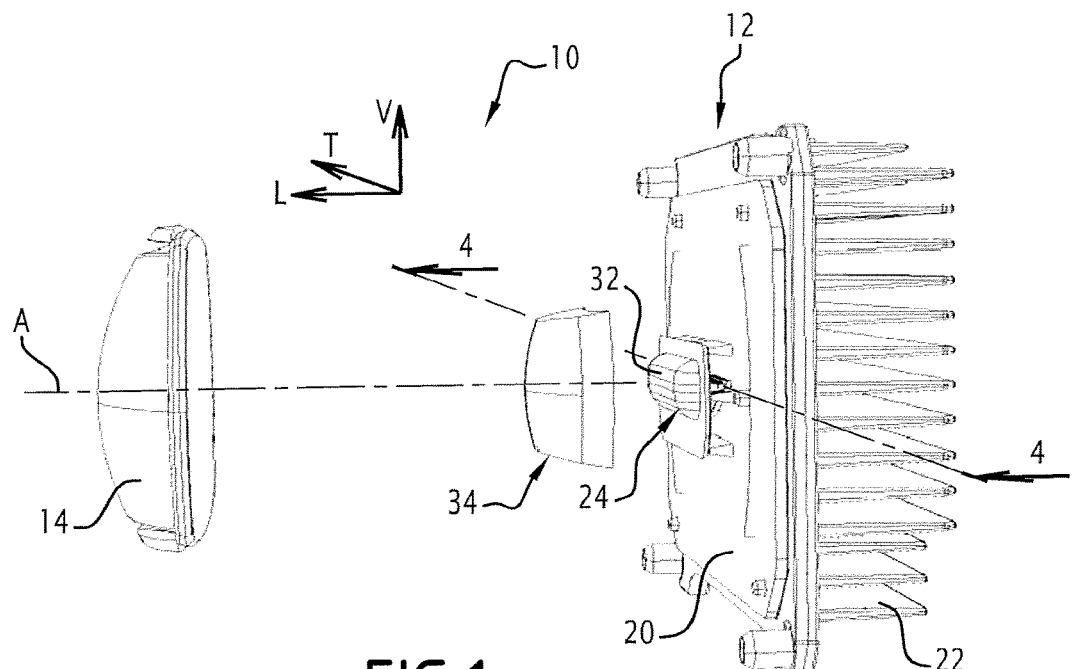
FIG. 1 is a perspective view which represents an optical lighting module produced according to the teachings of the invention.

FIG. 1 shows an optical lighting module 10 for a motor vehicle which is intended to emit a final light beam longitudinally forward. It is, here, an adaptive light beam which is composed of a plurality of elementary beams which overlap. Such an optical lighting module 10 is notably capable of fulfilling an adaptive high beam function, also known by the acronym "ADB" for "adaptive driving beam", or it is also capable of fulfilling a directional lighting beam function, also known by the acronym "DBL" for "dynamic bending light".

The optical module 10 is intended to equip a front lighting device of a motor vehicle. The front lighting device further comprises a second optical module intended to emit a single low light beam with cut-off.

The optical lighting module 10 mainly comprises light emission means 12 and a projection optic 14 which is arranged longitudinally in front of and at a distance from the emission means 12. The projection optic 14 has a longitudinal optical axis "A".

Figure 2:
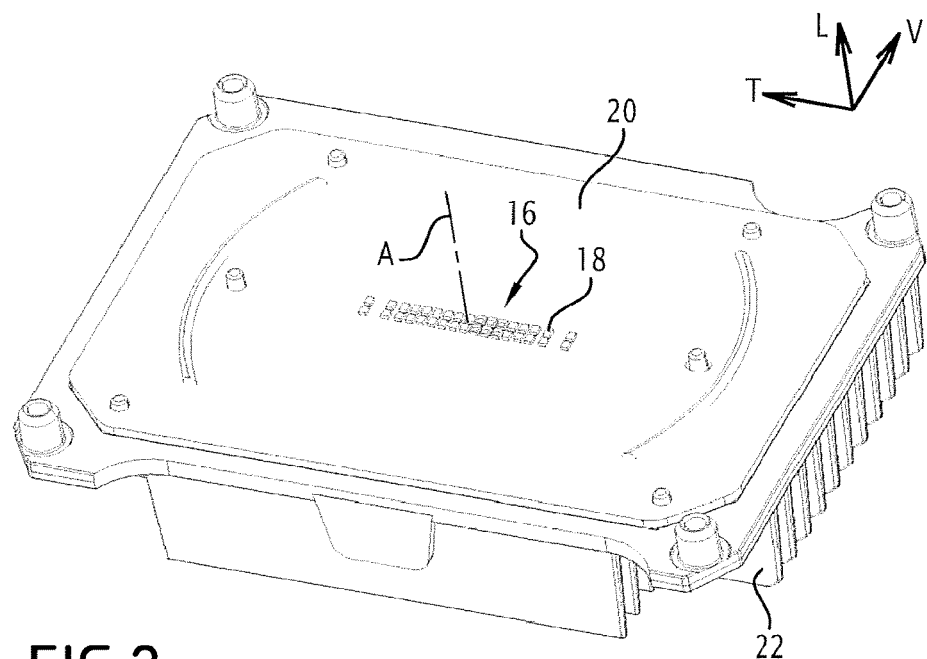
FIG. 2 is a perspective view which represents a printed circuit board of the optical module of FIG. 1 comprising a matrix of light-emitting diodes.

As represented in FIG. 2, the light emission means 12 here comprise a matrix 16 of primary elementary light sources 18. Here, they are light-emitting diodes 18. The matrix 16 is equipped with at least two transverse rows of seventeen light-emitting diodes 18, here with two rows. The optical axis "A" passes substantially through the middle of the matrix 16 in the transverse direction. All the light-emitting diodes 18 of the matrix have lighting surfaces of identical dimensions. Here, they are lighting surfaces of square form.

The matrix 16 extends in a plane orthogonal to the longitudinal direction "L". More particularly, the light-emitting diodes 18 are here borne by the front face of a printed circuit board 20.

These light-emitting diodes 18 are likely to emit heat during their operation. A heat sink 22 comprising cooling fins is therefore attached to the back of the printed circuit board 20 to discharge the heat.

The light-emitting diodes 18 emit light rays in a very open light cone. In the example represented in FIG. 5, the aperture angle is 180°. A primary optical element 24 is arranged longitudinally in front of the matrix 16 of light-emitting diodes 18 to modify the distribution of the emitted light rays.

Figure 3:
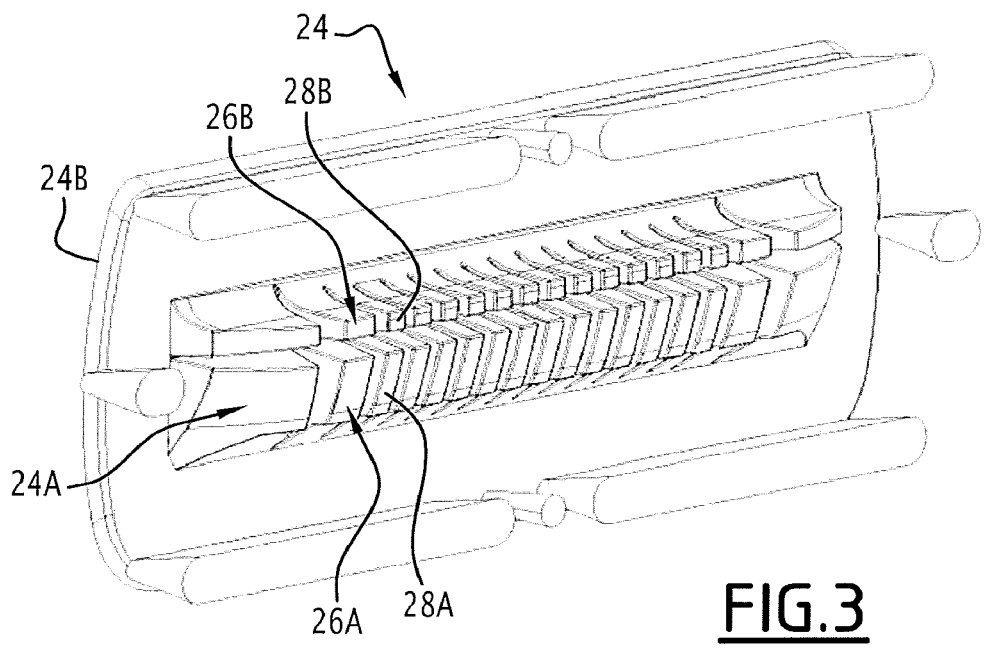
FIG. 3 is a perspective view which represents the rear of a primary optical element of the optical module of FIG. 1 comprising a plurality of light guides.

As represented in FIG. 3, the primary optical element here comprises a first rear portion 24A which is formed by a plurality of light guides 26A, 26B. Each light guide 26A, 26B extends along a longitudinal main axis from an input face 28A, 28B, to an output front end face 30A, 30B for the light rays, visible in particular in FIGS. 4 and 5. Each light guide 26A, 26B is designed to guide the rays entering through the input face 28A, 28B to the output face 30A, 30B. Each output face 30A, 30B forms a pixel that can be switched on selectively by individual control of each light-emitting diode 18.

The rear portion 24A comprises a matrix comprising at least as many light guides 26A, 26B as the matrix 16 comprises light-emitting diodes 18. Each light-emitting diode 18 is associated with a light guide 26A, 26B. Thus, the rear portion 24A comprises at least two rows of seventeen light guides 26A, 26B.

Figure 4:
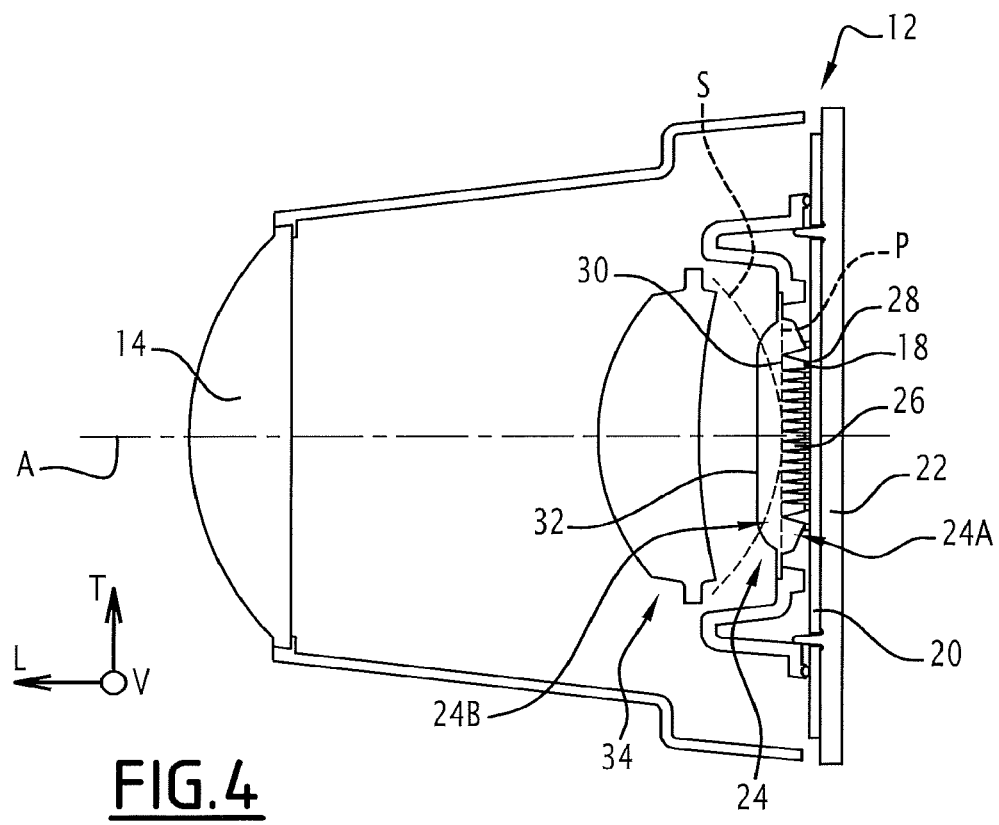
FIG. 4 is a sectional view along the horizontal cutting plane 4-4 of FIG. 1.

The input faces 28A, 28B of the light guides 26A, 26B are arranged in a common plane which is parallel to the plane of the printed circuit board 20. When the primary optical element 24 is arranged in the optical module 10, each input face 28A, 28B is thus positioned longitudinally opposite and in proximity to an associated light-emitting diode 18, as is illustrated in FIG. 4, such that most of the light rays emitted by each light-emitting diode 18 enters into the associated light guide 26A, 26B.

As can be seen in FIG. 3, each light guide 26A, 26B is likely to have a section adapted to produce an outgoing secondary elementary light beam of the form desired for the function of the optical lighting module 10. Each secondary elementary light beam has a smaller aperture angle than that of the light source 18.

As represented in the figures, the primary optical element 24 comprises two transverse rows of light guides. The light guides of the bottom first row will be denoted by the reference 26A whereas the light guides of the top second row will be denoted by the reference 26B.

The light guides 26A of the first type, hereinafter called "first light guides 26A", occupy the bottom row. They are intended to form heightwise-elongated pixels. More particularly, the elongated pixels have an overall rectangular form whose length extends vertically. To this end, the output face 30A of the first light guides 26A has a corresponding rectangular form.

The light guides 26B of the second type, hereinafter called "second light guides 26B", occupy the top row. They are intended to form pixels that are short in height compared to the elongated pixels. More particularly, the short pixels have an overall square form. To this end, the output face 30B of the second light guides 26B has a corresponding square form.

For each of the light guides 26A, 26B, the output face 30A, 30B has an outline of a form similar to that of the input face 28A, 28B. Thus, the input face 28A of the first light guides 26A has an outline of rectangular form. Similarly, the input face 28B of the second light guides 26B has an outline of square form.

As explained in the preamble, the image of a rectanglular pixel is intended to vertically overlap the image of a square pixel. To this end, each first light guide 26A is associated with a parallel second light guide 26B which is arranged in proximity to and to the right of the top edge of said associated first light guide 26A.

The output faces 30A, 30B of the light guides 26A, 26B are arranged in a common plane "P" of emission which is parallel to the plane of the printed circuit board 20, as indicated in FIG. 4. In this way, the light guides 26A, 26B all have an identical length.

The output faces 30A, 30B of the light guides 26A, 26B thus form a matrix, here a first row of seventeen output faces 30A of first light guides 26A and a second row of seventeen output faces 30B of second light guides 26B. Each of the output faces 30A, 30B is capable of emitting a secondary elementary beam in a longitudinal main direction of projection from the common plane "P" of emission orthogonal to the longitudinal direction "L". The output faces 30A, 30B are arranged in immediate proximity to one another, for example with a spacing of 0.1 mm.

The primary optical element 24 also comprises a front portion 24B for forming the secondary elementary light beams emitted by the elementary light sources 30.

The front portion 24B comprises a common output front end face 32 for the light rays of the primary optical element.

This front portion 24B is here produced in a single piece with the light guides 26A, 26B so that the primary optical element 24 is produced in a block.

The primary optical element 24 is for example produced in silicon, in polycarbonate, in polymethyl methacrylate (PMMA) or in any other material suited to the production of light guides 26A, 26B.

As a variant, the primary optical element 24 produced according to the teachings of the invention is produced in silicon.

The output front face 32 of the front portion 24B is conformed to spread the secondary elementary light beams vertically and/or horizontally.

The front face 32 has an outline of overall rectangular form whose length extends transversally, parallel to the rows of light guides 26A, 26B, and whose width extends vertically. The front face 32 is thus delimited vertically by a bottom transverse edge 36A and by a top transverse edge 36B. The front face 32 can also be delimited transversally by two vertical edges 37.

Figures 5, 6:
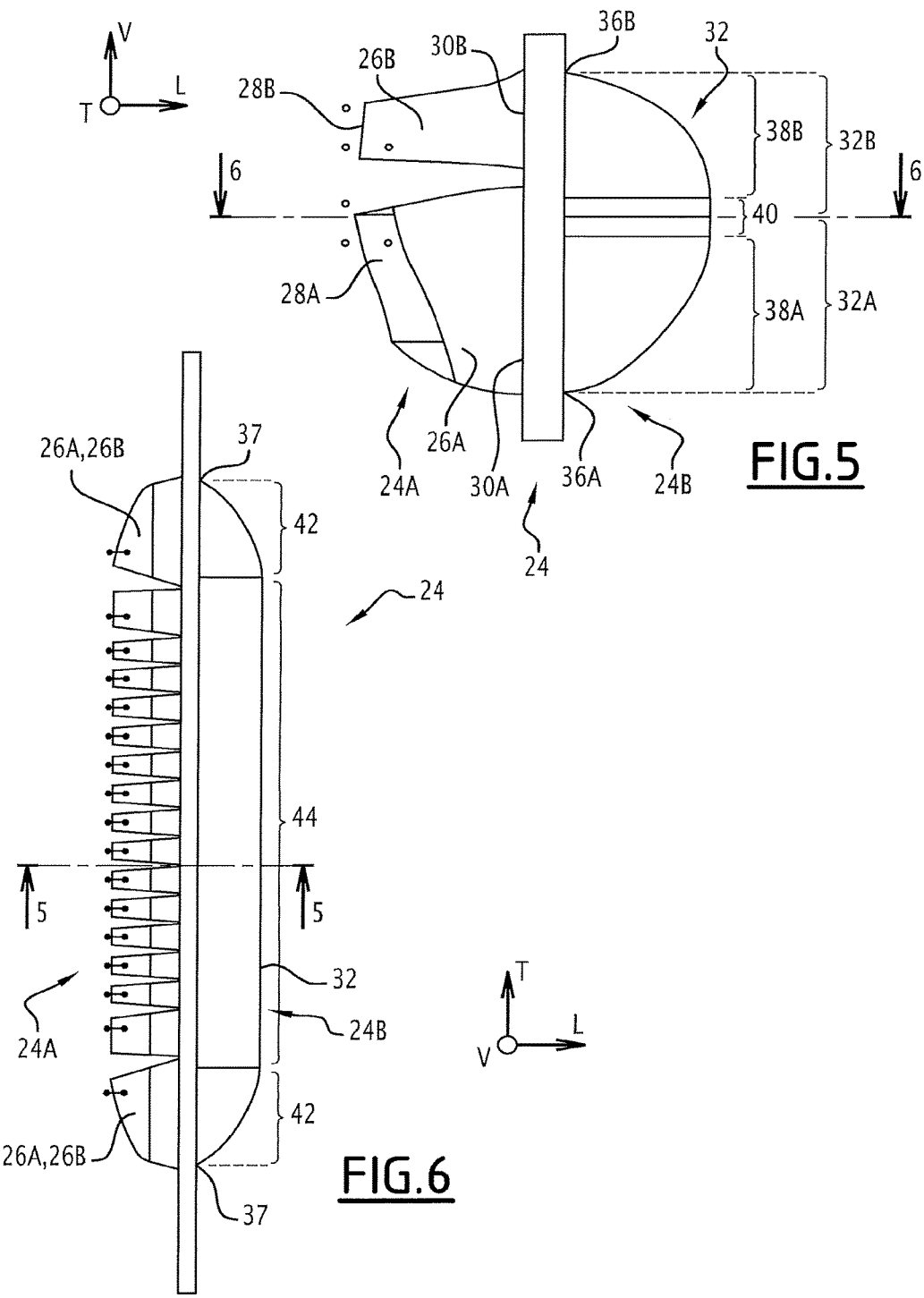
FIG. 5 is a vertical cross-sectional view along the cutting plane 5-5 of FIG. 6 which represents the primary optical element equipped with a convex output front face capable of spreading the secondary light beams vertically.
FIG. 6 is a transverse cross-sectional view along the cutting plane 6-6 of FIG. 5 which represents the primary optical element equipped with a convex output front face capable of transversally spreading the secondary light beams emitted by the end light guides of each row.

Hereinafter, and as is illustrated in FIG. 5, a distinction will be drawn between a bottom zone 32A of the front face 32 which is intended to receive the secondary light beams emitted by the light guides 26A of the bottom row, and a top zone 32B of the front face which is intended to receive the secondary light beams emitted by the light guides 26B of the top row.

According to a first aspect of the invention, the front face 32 of the front portion 24B is conformed to spread the secondary light beams at least in a vertical direction.

To this end, the output face 32 of the front portion 24B of the primary optical element has at least one free transverse vertical end strip 38A, 38B which is incurved about a transverse axis to spread the secondary light beams vertically emitted by a row of light guides 26A, 26B associated with this end strip 38A, 38B. Said transverse end strip 38A, 38B of the output face 32 thus has a convex form.

In the example represented in FIG. 5, the primary optical element 24 comprises two parallel transverse rows of light guides 26A, 26B. To allow the vertical spreading of the light beams emitted by the light guides 26A, 26B of each of these two rows, two transverse end strips vertically delimiting the output face 32 of the front portion 24B of the primary optical element are each incurved about a transverse axis to spread the secondary light beams vertically emitted by each associated row of light guides 26A, 26B.

More particularly, the bottom zone 32A has a bottom end strip 38A bordering the bottom edge 36A of the front face 32. This bottom end strip 38A has a convex progressive curvature which is conformed to spread the light rays vertically so as to form a light beam which extend over more than 5° vertically. To this end, in vertical longitudinal cross section, the curvature of the bottom end strip 38A has a tangent forming an angle that is overall less than 45° over most of the curvature. Thus, the light rays are slightly deflected downward by refraction by passing through the bottom end strip 38A. However, the secondary light beam emitted by each of the associated light guides 26A and exiting through the face 32 has a relatively sharp bottom limit.

Obviously, it will be understood that the invention is not limited to this particular curvature, and that the curvature will be able to be adapted according to the spreading desired for the light rays.

The top zone 32B has a top end strip 38B bordering the top edge 36B of the front face 32. This top end strip 38B has a convex curvature whose radius of curvature is more marked than that of the bottom end strip 38A so that the secondary light beam forms a pixel having a fuzzy top limit. To this end, in vertical longitudinal cross section, the curvature of the top end strip 38B has a tangent forming an angle that is overall greater than 45° over most of the curvature. Thus, the light rays at the top of the secondary light beam are deflected by a very significant angle upward by refraction by passing through the top end strip 38B. Thus, the secondary light beam emitted by each of the associated light guides 26B and exiting through the face 32 has a fuzzy top limit.

For the portions of secondary light beams which overlap to have a sharp limit, the output face 32 of the front portion 24B comprises a central strip 40 which extends vertically between the top and bottom end strips 38A, 38B. This central strip 40 has, in longitudinal vertical cross section, a rectilinear form.

As a variant, the height of the central strip can be adapted.

According to another variant of the invention, the output face does not comprise a central strip. Thus, the two curved strips are linked directly to one another without interposition of a central strip.

Furthermore, to make it possible to transversally spread the secondary light beam emitted by the end light guide 26A, 26B which is situated on the side of the road for each row, at least one transverse end vertical section 42 of the output face 32 of the front portion 24B has a curvature about a vertical axis to spread the secondary light beam emitted by the corresponding end light guide 26A, 26B of each of the rows in a transverse direction. The vertical section 42 to this end has a convex form in longitudinal transverse cross section.

In the example represented in the figures, the same primary optical element 24 is advantageously intended to equip vehicles independently of the side of mounting, on the left or on the right.

To thus make it possible to adapt one and the same primary optical element 24 to both sides of mounting, the two transverse vertical end sections 42 of the output face 32 of the front portion 24B each have a curvature about a vertical axis to spread the secondary light beam emitted by the corresponding end light guide of each of the rows in an opposite transverse direction.

As a variant, the output face has only a single curved end section, the other end section being eliminated. Referring to FIG. 6, one of the ends 42 of the optical module is then eliminated. The optical module thus comprises an output face that is asymmetrical in relation to a vertical longitudinal median plane. In this case, a different primary optical module is arranged on each side of the vehicle.

The vertical end strips 38A, 38B overlap the transverse end sections 42. Thus, the two end sections 42 simultaneously have curvatures both about a transverse axis and about a vertical axis. In other words, the transverse end sections 42 have a spheroidal form. In this way, the secondary light beams emitted by the end light guides 26A, 26B are spread vertically and transversally, so as to form a light distribution in the form of a veil.

By contrast, the secondary light beams emitted by the other light guides 26A, 26B are intended to be spread only in a vertical direction by the output face 32. A central section 44 of the output face extends opposite the light guides 26A, 26B of each row except for the two end light guides. In this respect, the central section 44 of the output face 32 of the front portion 24B, extending between the two transverse end sections 42, has a hemicylindrical form. Hemicylindrical should be understood to mean that the central section 44 of the output front face 32 is generated by displacement of a transverse straight line along an open curve formed by the vertical profile of the three transverse strips 38A, 38B, 40, as represented in FIG. 5. The output face 32 thus has a smooth appearance. As a variant that is not represented, the output face can also be partly embossed.

Moreover, the projection optic 14 is arranged longitudinally at a distance from and in front of the plane "P" of emission. The projection optic 14 is capable of projecting an image of the output faces 30A, 30B to infinity to form the final light beam. In projection onto a transverse vertical screen (not represented) situated at a great distance, for example at 25$m$, each illuminated output face 30A, 30B makes it possible to light a zone of the screen. The zones overlap slightly so as to light uniformly. Each diode is controlled individually so as to be able to selectively light each of the zones of the screen.

The projection optic 14 is here produced in a single block.

As is known, the projection optic 14 comprises an object focal surface "S" extends overall orthogonally to the optical axis "A" that it intersects at the object focal point.

For the final beam obtained to have light characteristics desired for its use, it is necessary for the output faces 30A, 30B to be imaged in a substantially sharp fashion. To this end, each elementary light source 30 is situated on the object focal surface of the projection optic 14.

Theoretically, the projection optic 14 is supposed to have an object focal surface that is flat and perfectly orthogonal to the optical axis "A". However, in reality, it is known that the projection optic 14 has an object focal surface that has a concave spherical curvature defect. Such a defect is called Petzval field aberration.

To make it possible to focus the projection optic 14 correctly on the elementary light sources 30, a secondary field correction optical element 34 are interposed between the plane "P" of emission and the projection optic 14. This field correction optical element 34 is specifically designed to correct the field curvature aberration of the projection optic 14. The field correction optical element 34 is formed by at least one field correction lens also known as "field flattener lens". In the example represented in the figures, the field correction optical element 34 comprises a single field correction lens which will therefore be referenced 34.

It will be noted that the input faces 28A, 28B of the two light guides 26A, 26B situated at the lateral ends are not arranged in one and the same vertical transverse plane. The faces 28A, 28B are for example arranged fan-wise around the light-emitting diodes. This makes it possible to participate in the spreading of the beam in the transverse direction.

The invention claimed is:

1. An optical lighting module for a motor vehicle, the optical lighting module comprising:
   at least two parallel transverse rows of light guides;
   a first rear portion including the light guides arranged along one of the at least two parallel transverse rows, each light guide comprising an output front end face for a light beam; and
   a front portion which has a front face for the light beam, wherein the front face of the front portion is conformed to spread the light beam at least in a vertical direction, an output face of the front portion having transverse vertical end strips, each incurved about a transverse axis to spread the light beam vertically emitted by one of the two parallel transverse rows of light guides.

2. The optical module according to claim 1, wherein the output face of the front portion comprises a central strip which extends vertically between two transverse vertical end strips and which has, in a longitudinal vertical cross section, a vertical rectilinear form.

3. The optical module according to claim 1, wherein at least one transverse end section of the output face of the front portion has a curvature about a vertical axis to spread the light beam emitted by a corresponding one of the two parallel transverse rows of light guides in a transverse direction.

4. The optical module according to claim 3, wherein two transverse end sections of the output face of the front portion each have a curvature about a vertical axis to spread the light beam emitted by the corresponding one of the two parallel transverse rows of light guides in a transverse direction.

5. The optical module according to claim 1, wherein a central section of the output face of the front portion extending between two transverse end sections has a hemicylindrical form.

6. The optical module according claim 5 wherein the central section extends opposite the two parallel transverse rows of light guides except for the two transverse end sections.

7. The optical module according to claim 1, wherein each light guide is associated a light-emitting diode.

8. The optical module according to claim 1, wherein a light beam producing an adaptive lighting function is emitted.

9. A motor vehicle lighting device comprising the optical module according to claim 1.

10. A lighting device according to claim 9, wherein the lighting device further comprises a low beam module.

11. The lighting device according to claim 10, wherein the output face of the front portion comprises a central strip which extends vertically between two vertical end strips and which has, in a longitudinal vertical cross section, a vertical rectilinear form.

12. The lighting device according to claim 10, wherein at least one transverse end section of the output face of the front portion has a curvature about a vertical axis to spread the light beam emitted by a corresponding one of the two parallel transverse rows of light guides in a transverse direction.

13. The lighting device according to claim 10, wherein a central section of the output face of the front portion extending between two transverse end sections has a hemicylindrical form.

14. The lighting device according to claim 10, wherein each light guide is associated with a light-emitting diode.

15. The lighting device according to claim 10, wherein a light beam producing an adaptive lighting function is emitted.

16. A motor vehicle lighting device comprising the optical module according to claim 10.

\* \* \* \* \*